United States Patent [19]

Striebig

[11] Patent Number: 4,638,695
[45] Date of Patent: Jan. 27, 1987

[54] BOARD SAW WITH SAWDUST EXHAUST

[75] Inventor: Ludwig Striebig, Lucerne, Switzerland

[73] Assignee: Striebig AG, Switzerland

[21] Appl. No.: 608,127

[22] Filed: May 8, 1984

[30] Foreign Application Priority Data

May 9, 1983 [CH] Switzerland ................ 2528/83

[51] Int. Cl.$^4$ ............... B27B 5/06; B27G 3/00
[52] U.S. Cl. ................ 83/100; 29/DIG. 86; 51/273; 83/471.3; 83/477.1; 83/488
[58] Field of Search ........ 83/100, 167, 471.2, 83/471.3, 473, 477.1, 483, 488; 125/14; 144/252 R, 252 A; 51/273; 29/DIG. 84, DIG. 86, DIG. 79; 409/137

[56] References Cited

U.S. PATENT DOCUMENTS

| | | | |
|---|---|---|---|
| 2,634,560 | 4/1953 | Ramm | 51/273 |
| 3,465,625 | 9/1969 | Daly | 83/100 |
| 4,150,597 | 4/1979 | Striebig | 83/471.3 |
| 4,202,231 | 5/1980 | Striebig | 83/471.2 |
| 4,253,362 | 3/1981 | Olson | 83/100 |
| 4,364,291 | 12/1982 | Jenkner | 83/100 |

FOREIGN PATENT DOCUMENTS 2506208 11/1982 France ............... 83/100

Primary Examiner—Frank T. Yost
Assistant Examiner—Hien H. Phan
Attorney, Agent, or Firm—Pahl, Lorusso & Loud

[57] ABSTRACT

An exhaust duct is arranged vertically slidably on a vertical board saw so that it always follows the vertical movement of the sawing unit during horizontal cutting. The exhaust duct is formed by a U-shaped profile, in which an endless driven band is guided. A slot provided in the band is located in front of the saw blade (S) in every position of the sawing unit; the sawdust thrown off by the saw blade thus passes through the slot into the space enclosed by the band and is exhausted. A sealing element is fitted on the front band side just in front of the slot. The apparatus ensures a virtually 100% discharge of the chips and sawdust in the case of horizontal cutting, which is of great significance particularly in sale rooms and exhibition rooms, and contributes to humane conditions in the workshop.

8 Claims, 5 Drawing Figures

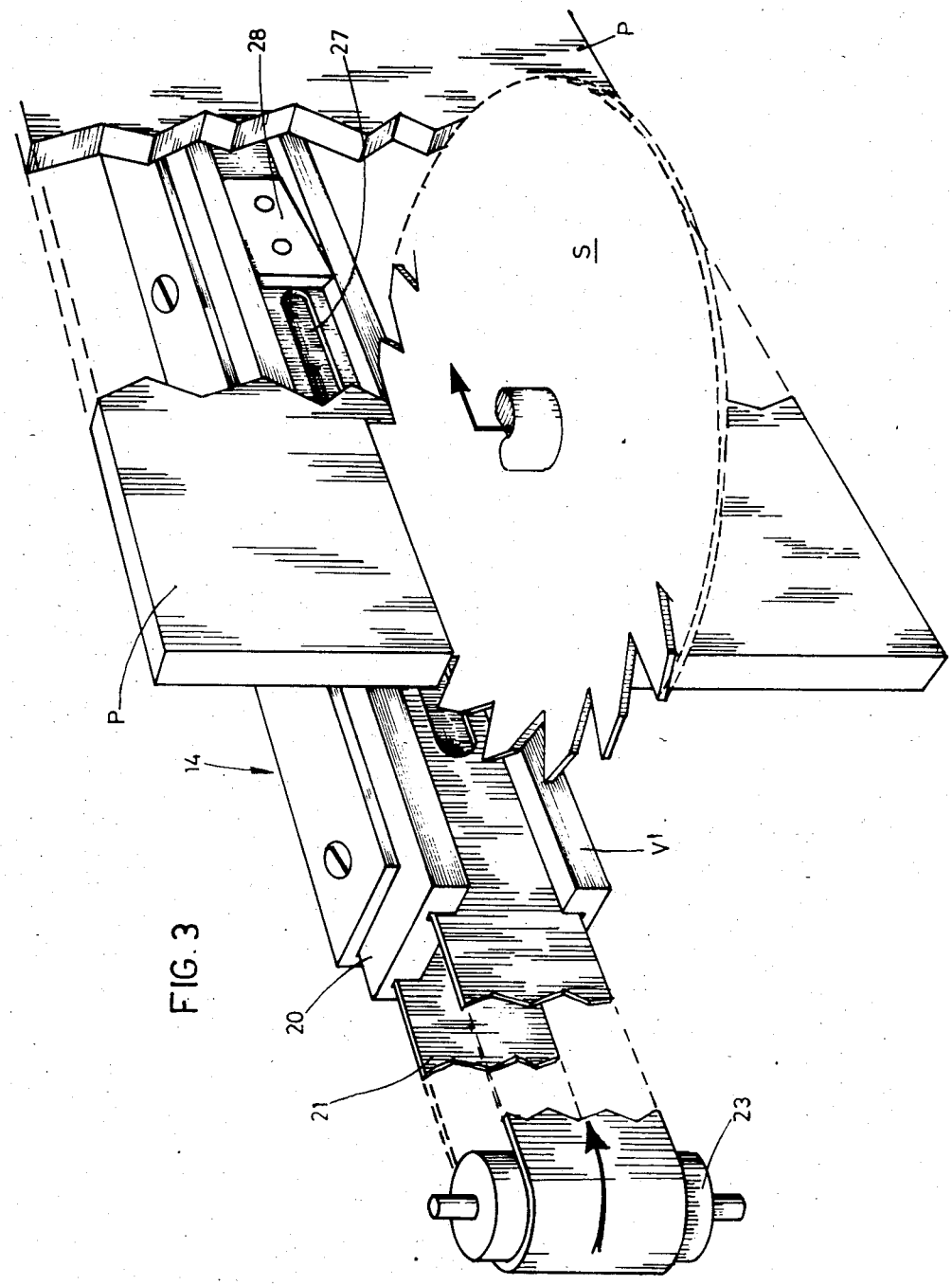

BOARD SAW WITH SAWDUST EXHAUST

BACKGROUND OF THE INVENTION

The present invention relates to an apparatus for making horizontal and vertical cuts in laminar sawable objects such as sheets of wood, chipboard et cetera, with a virtually upright frame, on which at least one motor-driven sawing unit is arranged which can be displaced in the vertical and/or horizontal direction in the frame plane, whilst an exhaust pipe connected to a vacuum source ends in the work region of each at least one sawing unit.

Apparatuses of this type, which are also called vertical board saws, are to be found nowadays not only in furniture factories and carpenters' shops but also in the numerous do-it-yourself centres, in which sheets of wood, chipboards and the like are cut to size for hobby enthusiasts.

The exhaust device connected to the sawing unit is demonstrably capable, in the known installations, of discharging approximately 94 to 98% of the incident sawdust, so that an average of 4% still passes into the environment. Experiments have revealed that this is that quantity of dust which is caught between the teeth of the saw blade during a saw cut and is subsequently thrown off by centrifugal force in the direction of the saw movement behind the board to be sawn. Because board saws are frequently erected in the region of sale rooms and exhibition rooms, this incidence of dust becomes disagreeably noticeable even after a short time, because on the one hand it pollutes the breathing air, and on the other hand it settles on the goods exhibited. Hitherto, however, it has proved impossible to find any means of eliminating likewise this additional incidence of dust in a reliable manner.

It is therefore the aim of the present invention to improve an apparatus of the above-mentioned type so that virtually the total quantity of incident chips and sawdust can be caught and discharged during horizontal cutting—and also during vertical cutting in the case of a preferred embodiment.

The invention is thus intended to make a substantial contribution to improving the climate in workshops and salerooms and to reduce the settling of dust on exhibited objects.

The apparatus is defined in the independent patent claim. Preferred embodiments are given in the subordinate patent claims.

BRIEF DESCRIPTION OF THE FIGURES OF THE DRAWING

An exemplary embodiment of the object of the invention is described below with reference to the accompanying drawing.

FIGS. 2 and 3 are views on a larger scale of structural details in the region of the saw.

DETAILED DESCRIPTION OF THE PREFERRED EMBODIMENT

Figure 1:
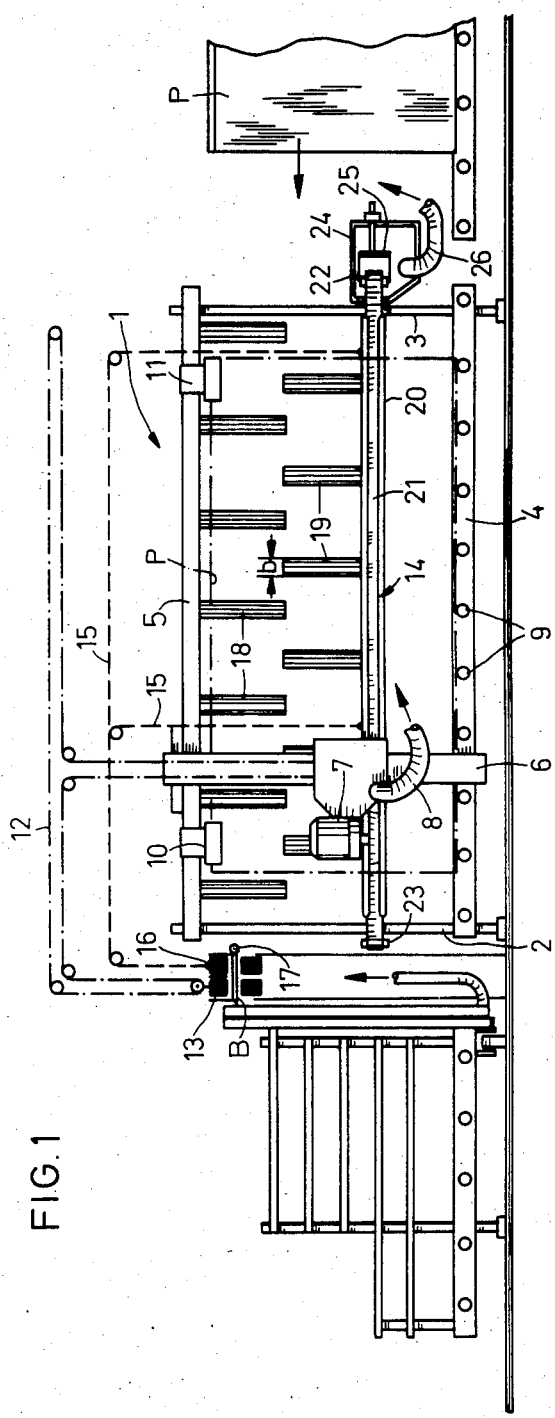
FIG. 1 is a simplified elevation of a preferred embodiment of the apparatus according to the invention.

A frame, generally designated 1, exhibits two vertical columns 2 and 3 and two horizontal girders 4 and 5 connected firmly to the vertical columns. A guide beam 6 is arranged through the intermediary of rollers and rails on the two horizontal girders 4 and 5 so that it can be moved in horizontal reciprocation along the total length of the frame 1. The sawing unit 7, which is attached to the guide beam 6, is on the one hand slidable in vertical reciprocation along the guide beam 6, and can on the other hand be pivoted as required so that the circular saw blade assumes a horizontal or vertical cutting position.

An exhaust pipe 8, which serves to discharge the sawdust produced and is connected to a vacuum source not shown, ends at the sawing unit 7. The lower horizontal girder 4 is provided with rollers 9 mounted for loose rotation, upon which a wooden board P, indicated by chain-dotted lines, is supported. According to a known work method the board P is retained by two vertically reciprocating clamp claws 10/11 arranged on the upper girder 5. After a lower board section has been parted by a horizontal cut, in the case of this arrangement the upper board section can be raised somewhat, whereupon the lower one can be further subdivided by vertical cuts and then discharged to the left on the rollers 9; the upper residual section can now be lowered onto the rollers 9 and likewise subdivided vertically.

In order to compensate the weight of the sawing unit 7, it is connected via a cable 12 to a counterweight 13. The cable 12 is passed over the pulleys illustrated so that the counterweight 13 moves a corresponding amount in the opposite direction at each vertical displacement of the sawing unit 7. In this manner the sawing unit 7 can easily be guided manually along the guide beam 6 during vertical cutting. A horizontal exhaust duct 14 is guided with vertical sliding mobility on the two columns 2 and 3 of the frame. This exhaust duct 14 is likewise engaged by a cable 15, which is connected via pulleys to a counterweight 16. Both counterweights 13 and 16 are guided in two parallel guide tracks in a vertical shaft, and are provided with bores B in the embodiment illustrated. As soon as the two counterweights are at equal height, as the figure shows, they can be coupled by a bolt 17 which penetrates the two bores B and thus couples the two counterweights to form a rigid entity.

In a preferred embodiment, it is further provided that the exhaust duct 14 is provided with a drive means which automatically guides it to the level of the saw blade as soon as the sawing unit 7 is pivoted into the horizontal cutting position. If the apparatus is provided with two sawing units, one of which is intended for horizontal cutting and the other for vertical cutting, then the exhaust duct obviously always follows the horizontal cutting saw. Instead of the mechanical coupling by means of the plug-in bolt 17, it would indubitably also be possible to choose a different mode of coupling. In a particularly advantageous preferred embodiment, for example, each counterweight (e.g. 13) exhibits a solenoid facing the other counterweight (e.g. 16), so that the coupling can be effected by merely closing an electrical contact. In this variant it is further provided that this electromagnetic coupling occurs whenever the saw blade has assumed its work position in the region of the support beam, and the sawing unit also occupies its horizontal cutting position. The electrical circuit means necessary for this purpose, including the associated contacts, may be presumed to be known to the expert and is therefore not described in detail.

For the purpose of supporting the wooden board P, a plurality of support arms 18 are further attached to the upper girder 5, and extend from the girder 5 downwards over a fraction, for example one third, of the frame height, their mutual interval being required to correspond at least to the width b of the upwardly projecting support arms 19 attached to the exhaust duct 14. Thus when the exhaust duct 14 is raised, the support arms 19 attached thereto enter the interstices between adjacent support arms 18. The support arms 18 and 19 are, for example, constructed as circular cylindrical hollow plastic elements.

The exhaust duct, generally designated 14, exhibits a metal U-shaped profile 20, which is open on its front side facing the sawing unit. Within this U-shaped profile 20 an endless band 21 is passed over rollers 22/23 mounted for free rotation. Whereas one of these rollers, designated 23, is attached to the column 2, the other one, designated 22, is mounted by means of a stirrup 25 within an exhaust housing 24 which is attached by a hose 26 to a vacuum source (fan).

Figure 2:
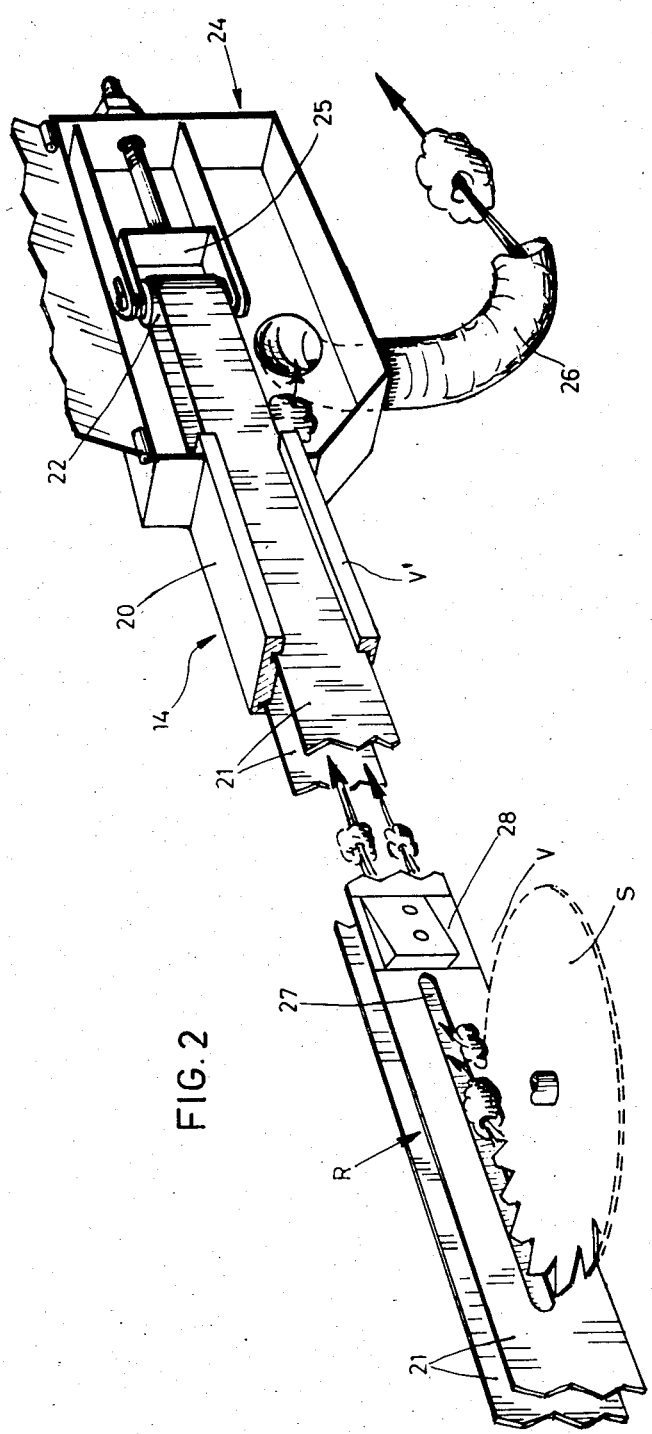

On its front side facing the saw blade S (FIG. 2) the band 21 exhibits a slot 27, which is arranged in front of the saw blade S so that it picks up the sawdust thrown away centrifugally from the rotating saw blade. Just in front of the slot 27, a sealing element 28 is attached to the movable band 21, its front edge V preferably being flush with the front edge V′ of the U-shaped profile 20.

The endless band 21 is connected via connecting members, not shown, to the sawing unit 7 so that it automatically follows the horizontal displacement of the latter, whilst the slot 27 is always located immediately in front of the saw blade S.

When the apparatus described is in service, the interior of the exhaust housing 24, and hence also the space R enclosed by the band 21, is under vacuum. The sawdust entrained by the saw blade S between the saw teeth is thrown by centrifugal force into the slot 27, sucked there by the vacuum into the space R and finally discharged through the exhaust housing 24 and the hose 26.

Because the board P to be parted (FIG. 3) abuts the front edge V′ of the U-shaped profile 20 during the saw cut, the sealing member 28 delimits the exhaust space towards the exterior, so that the sawdust thrown away passes reliably through the slot 27 into the exhaust system.

Figure 5:
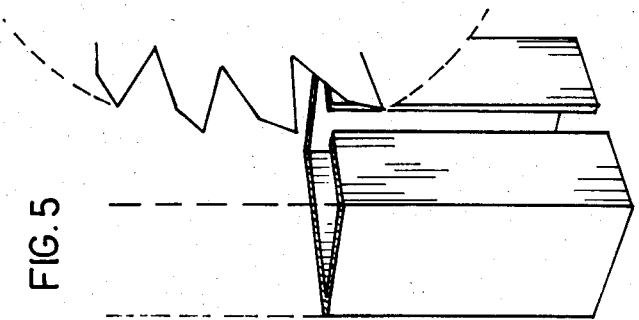
FIG. 4 is a perspective view of a lateral section of the apparatus and FIG. 5 shows a detail on a larger scale from FIG. 4.
Figure 4:
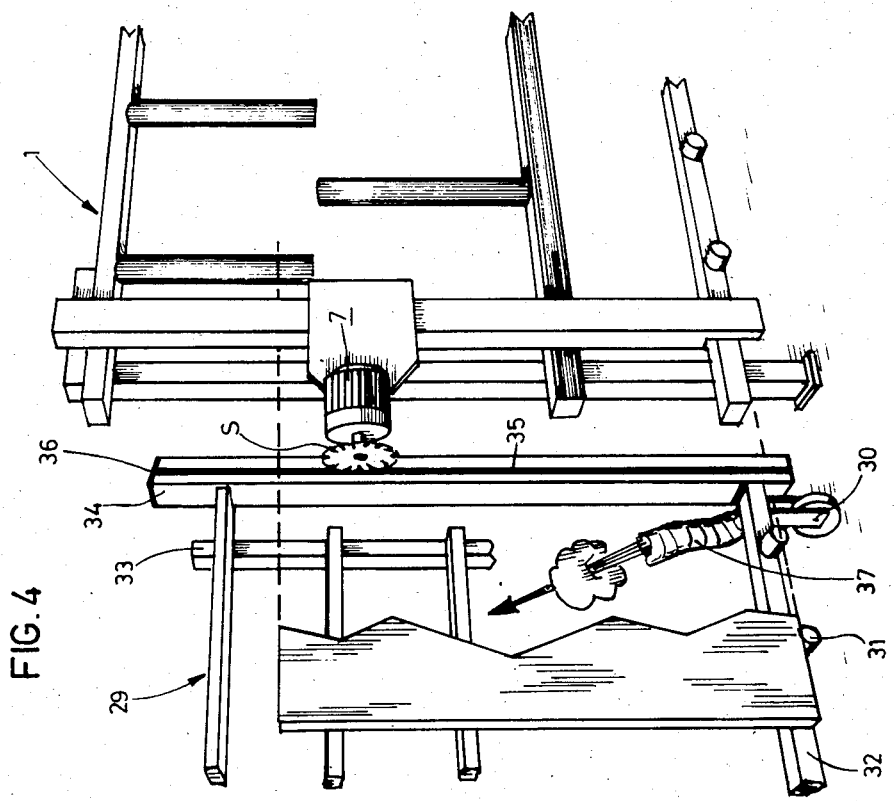

The arrangement so far described serves exclusively to discharge the sawdust during the execution of horizontal cuts. In order to ensure a virtually 100% discharge of sawdust also during vertical cutting, a complementary auxiliary device may be used, which is illustrated in FIGS. 4 and 5.

According to these figures, an auxiliary frame 29 transportable on rollers 30 is provided in addition to the described frame 1, and exhibits an upright exhaust profile 34 in addition to the rollers 31, girders 32 and columns 33 necessary to support the boards. This exhaust profile is preferably a metal box profile, having at its front side a slot 35, the width of which should correspond at least to that of the saw blade S. The metal box profile is also open at the top and its interior is connected by a hose 37 to a vacuum system. When executing vertical cuts, therefore, the board is preferably displaced so that the line of cut comes to lie upon the slot 35; during the cutting process the saw blade S of the sawing unit 7 dips into the slot 35, and the sawdust thrown off is, here again, reliably exhausted.

The vertical exhaust profile 34 is mounted slidably so that it can be moved into the service position behind the work plane of the sawing unit 7 which is necessary for horizontal cutting. In the case of the currently customary commercial construction of the known board saws with a single sawing unit which can be pivoted as required into a work position for horizontal or vertical cutting, it may preferably be provided that the sliding movement of the vertical hollow profile 34 is coupled to the pivoting movement of the sawing unit 7 so that the hollow profile 34 moves behind the work plane of the sawing unit when the latter is pivoted into the horizontal work position.

The endless band 21 is preferably a flexible, wear-resistant plastic band. The coupling of this plastic band to the sliding movement of the sawing unit 7 is preferably effected by a cable which is passed by means of return pulleys both over the guide beam 6 and also over the plastic band.

Instead of the endless band 21, a slot could also be provided in a box profile, extending along the total length of the exhaust duct, and the parts of which remote from the saw blade are masked by the board P itself.

What is claimed is:

1. Apparatus for making horizontal and vertical cuts comprising an upright frame having a length and a height, at least one motor-driven sawing unit which is supported by the frame and displaceable in the vertical and horizontal directions and which further includes a circular saw blade having a perimeter, an exhaust pipe connectable at one end to a vacuum source and connected at the other end to the at least one sawing unit, an exhaust duct which is connectable to a vacuum source and extends along the frame length, and is slidably vertically mounted upon the frame, the exhaust duct having a closed hollow profile with a blade face and a frame face, a movably mounted band supported by the frame which is movable along the blade face and which is positively connected to the horizontal displacement of the sawing unit, the band having an exhaust slot adjacent the saw blade at the point of sawing, considered in the sawing direction, such that the object being sawn passes between the saw unit and the exhaust duct to exhaust the sawdust produced behind the object being sawn.

2. Apparatus according to claim 1 wherein the movable band is offset away from the saw unit toward the frame relative to the blade face of the hollow profile which serves as a support means for the object being sawn, such that an interstice is created between the band and the blade face which interstice is closed by a sealing element connected to the band.

3. Apparatus according to claim 2 wherein the band includes an endless flexible band passed over rollers supported by the frame which is movable within the blade face of the exhaust duct, wherein the band is coupled to the horizontal sliding movement of the sawing unit by a connecting member so that the exhaust slot is always located in front of the saw blade during horizontal cutting.

4. Apparatus according to claim 3, wherein the sawing unit is mounted on a beam slidable horizontally on the frame and the connecting member includes a cable which is passed over the rollers both over the beam and over the band.

5. Apparatus according to claim 1 further comprising a vertical, closed hollow profile connectable to a vacuum source which is positioned relative to the vertical displacement of the sawing unit and which profile extends along the frame height and has a vertical continuous slot, the width of which is at least as large as that of the saw blade which blade extends into the slot during vertical cutting.

6. Apparatus according to claim 5 wherein the vertical hollow profile is mounted slidably with respect to the sawing unit so that it can be moved away from the sawing unit beyond the plane in which the perimeter of the saw blade travels during horizontal cutting.

7. Apparatus according to claim 6 wherein the at least one sawing unit is pivotable into work positions for horizontal and vertical cutting and the vertical hollow profile slides in response to the pivoting movement of the sawing unit, so that the vertical hollow profile moves away from the sawing unit and beyond the plane through which the perimeter of the saw blade travels during horizontal cutting when the sawing unit is pivoted into the horizontal work position.

8. Apparatus for making horizontal and vertical cuts comprising an upright frame having a length and a height, at least one motor-driven sawing unit which is supported by the frame and displaceable in the vertical and horizontal directions and which further includes a circular saw blade having a perimeter, an exhaust pipe connectable at one end to a vacuum source and connected at the other end to the at least one sawing unit, an exhaust duct which is connectable to a vacuum source and extends along the frame length and is mounted vertically slidable upon the frame, the exhaust duct having a closed hollow profile with a blade face and a frame face, a movably mounted band which is supported by the frame and movable along the blade face and which has an exhaust slot, the band being positively connected to the horizontal displacement of the at least one sawing unit such that the exhaust slot remains adjacent the saw blade whereby the object being sawn passes between the sawing unit, and the exhaust duct such that sawdust is exhausted from the surface of the object being sawn that faces away from the sawing unit.

* * * * *